United States Patent
Chen et al.

(10) Patent No.: US 11,810,459 B1
(45) Date of Patent: Nov. 7, 2023

(54) VEHICLE LOCALIZATION BASED ON RADAR DETECTIONS IN GARAGES

(71) Applicant: Aptiv Technologies Limited, St. Michael (BB)

(72) Inventors: Nanhu Chen, Lafayette, IN (US); Jeremy S. Greene, Indianapolis, IN (US)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/662,576

(22) Filed: May 9, 2022

(51) Int. Cl.
- *G01S 13/89* (2006.01)
- *G08G 1/14* (2006.01)
- *G06V 20/13* (2022.01)
- *G01S 19/39* (2010.01)

(52) U.S. Cl.
CPC ............ *G08G 1/148* (2013.01); *G01S 19/393* (2019.08); *G06V 20/13* (2022.01); *G08G 1/142* (2013.01)

(58) Field of Classification Search
None
See application file for complete search history.

(56) References Cited

U.S. PATENT DOCUMENTS

| | | |
|---|---|---|
| 9,194,949 B2 | 11/2015 | Becker et al. |
| 9,562,778 B2 | 2/2017 | DuHadway et al. |
| 9,594,378 B2 | 3/2017 | Laur et al. |
| 10,106,153 B1 * | 10/2018 | Xiao .................. G06F 18/24 |
| 10,345,107 B2 | 7/2019 | Laur et al. |
| 10,962,372 B1 | 3/2021 | Rao |

(Continued)

FOREIGN PATENT DOCUMENTS

| | | |
|---|---|---|
| DE | 102012106932 A1 | 5/2014 |
| DE | 102015002144 A1 | 8/2016 |

(Continued)

OTHER PUBLICATIONS

"Extended European Search Report", EP Application No. 20193680.4, dated Feb. 18, 2021, 9 pages.

(Continued)

*Primary Examiner* — John F Mortell
(74) *Attorney, Agent, or Firm* — Sawtooth Patent Group PLLC

(57) ABSTRACT

This document describes techniques and systems for vehicle localization based on radar detections in garages and other GNSS denial environments. In some examples, a system includes a processor and computer-readable storage media comprising instructions that, when executed, cause the system to obtain structure data regarding a GNSS denial environment and generate, from the structure data, radar localization landmarks. The radar localization landmarks include edges or corners of the GNSS denial environment. The instructions also cause the processor to generate polylines along or between the radar localization landmarks to generate a radar occupancy grid. The instructions further cause the processor to receive radar detections from one or more radar sensors and obtain a vehicle pose within the radar occupancy grid to localize the vehicle within the GNSS denial environment. In this way, the system can provide highly accurate vehicle localization in GNSS denial environments in a cost-effective manner.

20 Claims, 6 Drawing Sheets

(56) References Cited

U.S. PATENT DOCUMENTS

| | | |
|---|---|---|
| 2012/0310504 A1 | 12/2012 | DuHadway et al. |
| 2013/0103298 A1 | 4/2013 | Becker et al. |
| 2015/0022392 A1 | 1/2015 | Hegemann et al. |
| 2015/0353083 A1 | 12/2015 | Hasberg et al. |
| 2018/0051998 A1 | 2/2018 | Stephens et al. |
| 2018/0080785 A1 | 3/2018 | Han et al. |
| 2018/0088574 A1 | 3/2018 | Latotzki et al. |
| 2018/0188037 A1 | 7/2018 | Wheeler et al. |
| 2018/0325012 A1 | 11/2018 | Ferrari et al. |
| 2018/0365908 A1 | 12/2018 | Liu et al. |
| 2019/0196008 A1 | 6/2019 | Lee et al. |
| 2019/0376807 A1 | 12/2019 | Iagnemma |
| 2020/0101974 A1 | 4/2020 | Ha et al. |
| 2020/0217943 A1 | 7/2020 | Pishehvari et al. |
| 2020/0348408 A1 | 11/2020 | Peng et al. |
| 2021/0033411 A1 | 2/2021 | Violetta |
| 2021/0163021 A1 | 6/2021 | Frazzoli et al. |
| 2022/0135071 A1 | 5/2022 | Smith et al. |
| 2022/0197301 A1* | 6/2022 | Moawad ............ G05D 1/0257 |
| 2022/0198929 A1* | 6/2022 | Dudar ............... G05D 1/0278 |
| 2023/0080061 A1 | 3/2023 | Wang et al. |

FOREIGN PATENT DOCUMENTS

| | | |
|---|---|---|
| DE | 102016003934 A1 | 10/2017 |
| DE | 102017214012 A1 | 2/2019 |
| DE | 102018218182 A1 | 4/2020 |
| EP | 3517996 A1 | 7/2019 |
| EP | 3671546 A1 | 6/2020 |

OTHER PUBLICATIONS

"Smart Summon", Tesla Model 3 Owner's Manual, Retrieved from https://www.tesla.com/ownersmanual/model3/en_nz/GUID-6B9A1AEA-579C-400E-A7A6-E4916BCD5DED.html on Mar. 7, 2022, 6 pages.

Abdelgalil, et al., "Multi-Robot SLAM: An Overview", Jan. 2019, 11 pages.

Bouzouraa, "Fusion of Occupancy Grid Mapping and Model Based Object Tracking for Driver Assistance Systems using Laser and Radar Sensors", Jun. 2010, pp. 294-300.

Bruns, "Lidar-based Vehicle Localization in an Autonomous Valet Parking Scenario", Thesis, The Ohio State University, 2016, 57 pages.

Einsiedler, et al., "Vehicle Indoor Positioning: A Survey", Oct. 2017, 6 pages.

Guidolini, et al., "Removing Movable Objects from Grid Maps of Self-Driving Cars Using Deep Neural Networks", Jul. 2019, 8 pages.

Holder, et al., "Real-Time Pose Graph SLAM based on Radar", Jun. 2019, 7 pages.

Javanmardi, et al., "Autonomous vehicle self-localization based on abstract map and multichannel LiDAR in urban area", May 2018, 13 pages.

Klemm, et al., "Autonomous Multi-Story Navigation for Valet Parking", 2016 IEEE 19th International Conference on Intelligent Transportation Systems (ITSC), 2016, 8 pages.

Li, et al., "Environment Mapping and Vehicle Localization with a High-Resolution Radar Prototype", Sep. 2019, 9 pages.

Li, et al., "Extracting General-Purpose Features from LIDAR Data", 2010 IEEE International Conference on Robotics and Automation, May 3, 2010, 6 pages.

Pettersson, et al., "Estimation of local Map from Radar Data", Masters Thesis, 2014—Retrieved at http://liu.diva-portal.org/smash/get/diva2:761904/FULLTEXT01.pdf, 2014, 101 pages.

Pishehvari, et al., "Radar Scan Matching Using Navigation Maps", Feb. 2019, 8 pages.

Poggenhans, et al., "Precise Localization in High-Definition Road Maps for Urban Regions", Oct. 2018, 8 pages.

Qin, et al., "AVP-SLAM: Semantic Visual Mapping and Localization for Autonomous Vehicles in the Parking Lot", 2020 IEEE/RSJ International Conference on Intelligent Robots and Systems (IROS), Oct. 2020, pp. 5939-5945.

Saarinen, et al., "Normal Distributions Transform Occupancy Maps: Application to Large-Scale Online 3D Mapping", May 2013, pp. 2233-2238.

Sahdev, "Free Space Estimation using Occupancy Grids and Dynamic Object Detection", Aug. 2017, 10 pages.

Schoen, et al., "Real-Time Radar SLAM", Jan. 2017, 10 pages.

Song, et al., "Floorplan-based Localization and Map Update Using LiDAR Sensor", 2021 18th International Conference on Ubiquitous Robots (UR), Jul. 2021, pp. 30-34.

Ward, et al., "Vehicle localization with low cost radar sensors", Jun. 2016, 8 pages.

"Extended European Search Report", EP Application No. 21210140.6, dated Aug. 22, 2022, 12 pages.

"Extended European Search Report", EP Application No. 21210142.2, dated Aug. 23, 2022, 11 pages.

"Atari 1040 ST Bedienungshandbuch", Jan. 1, 1987, 95 pages.

"Extended European Search Report", EP Application No. 21209134.2, dated May 12, 2022, 10 pages.

"Extended European Search Report", EP Application No. 21209674.7, dated May 13, 2022, 10 pages.

"Partial European Search Report", EP Application No. 21210140.6, dated May 20, 2022, 16 pages.

"Partial European Search Report", EP Application No. 21210142.2, dated May 23, 2022, 13 pages.

"Sinclair ZX81 Personal Computer", Retrieved from: https://www.zock.com/8-Bit/D_ZX81.HTML, Jan. 1, 1983, 4 pages.

Almalioglu, et al., "Milli-RIO: Ego-Motion Estimation with Low-Cost Millimetre Wave Radar", Mar. 6, 2020, 9 pages.

Hanke, et al., "Virtual Sensorics: Simulated Environmental Perception for Automated Driving Systems", Jul. 9, 2020, 119 pages.

Mahmoud, et al., "Parking Map Generation and Tracking Using Radar—Adaptive Inverse Sensor Model", Jun. 29, 2020, 71 pages.

Markiewicz, et al., "Developing Occupancy Grid with Automotive Simulation Environment", Oct. 29, 2020, 16 pages.

Schuster, et al., "Robust Localization based on Radar Signal Clustering", Jun. 19, 2016, pp. 839-844.

Varjotie, et al., "Accuracy analysis of scan registration in Normal Distributions Transform based simultaneous localization and mapping using radar and laser scanning", Jun. 26, 2019, 71 pages.

Zhu, et al., "Reference Map Generation Techniques for Radar Scene Matching Guidance: An Overview", Mar. 1, 2009, 4 pages.

"Extended European Search Report", European Application No. 23162302.6, dated Sep. 18, 2023, 13 pages.

* cited by examiner

VEHICLE LOCALIZATION BASED ON RADAR DETECTIONS IN GARAGES

BACKGROUND

Vehicle localization is a technique of using sensor data to localize a vehicle to a map (e.g., determining the location of the vehicle on the map). Vehicle localization may be used to support autonomous vehicle operations (e.g., navigation, path planning, lane determination and centering, and curve execution without lane markers). To accurately position the vehicle relative to its environment, vehicle localization includes obtaining the position, from various sensors and navigation systems onboard the vehicle, of stationary localization objects (e.g., signs, poles, barriers) and relating these positions with known locations on the map. The vehicle location or pose may then be determined in relation to these objects.

Some autonomous vehicles perform driving operations, which depend on a localization accuracy that is near the sub-meter accuracy level. The sub-meter accuracy level may be achieved with navigation systems, including global navigation satellite systems (GNSS) receivers. However, GNSS systems generally cannot receive positioning data when the vehicle is within a GNSS denial environment, such as an indoor parking structure or garage.

SUMMARY

This document describes techniques and systems for vehicle localization based on radar detections in garages and other GNSS denial environments. In some examples, a system includes at least one processor and at least one computer-readable storage medium comprising instructions that, when executed by the processor, cause the system to obtain structure data regarding a GNSS denial environment and generate, from the structure data, radar localization landmarks for the GNSS denial environment. The radar localization landmarks include edges or corners of the GNSS denial environment, which can be a parking garage. The instructions also cause the processor to generate polylines along or between the radar localization landmarks to generate a radar occupancy grid for the GNSS denial environment. The instructions further cause the processor to receive radar detections from one or more radar sensors and obtain a vehicle pose within the radar occupancy grid to localize the vehicle within the GNSS denial environment. In this way, the system can provide highly accurate vehicle localization in GNSS denial environments in a cost-effective manner.

This document also describes methods performed by the above-summarized system and other configurations of the system set forth herein and means for performing these methods.

This Summary introduces simplified concepts related to vehicle localization based on radar detections in garages, which are further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

Systems and techniques enabling vehicle localization based on radar detections in garages are described with reference to the following drawings. The same numbers are used throughout the drawings to reference like features and components:

FIGS. 5-1 and 5-2 are illustrations of example edges and lines extracted from a satellite image for vehicle localization in a parking garage.

DETAILED DESCRIPTION

Overview

As described above, vehicle localization can support autonomous vehicle operations (e.g., navigation, path planning, lane determination and centering, and curve execution without lane markers). Autonomous vehicle operations can depend on a localization accuracy that is near the sub-meter accuracy level. The sub-meter accuracy level may be achieved with navigation systems, including global navigation satellite systems (GNSS) receivers. However, GNSS systems generally cannot receive positioning data when the vehicle is within a GNSS denial environment, such as an indoor parking structure or garage, and thus autonomous vehicle operations may not be available in such environments.

For GNSS denial environments, some systems may use Simultaneous Localization and Mapping (SLAM) techniques that map out features as a vehicle traverses through an unknown environment. These SLAM systems can then use the mapped-out features to localize the vehicle. Such systems generally rely on vision, LiDAR, or radar systems and complex feature-extraction algorithms to localize the host vehicle to environment features (e.g., parking garage walls).

Other systems may use an absolute map for the GNSS denial environment. The absolute map anchors the environment to a global coordinate system and allows the host vehicle to smoothly handle a transition between open skies and indoor environments. Such systems, however, rely on an expensive inertial measurement unit (IMU) system that uses vehicle odometry to maintain the vehicle positioning inside the GNSS denial environment. In addition, such absolute maps for GNSS denial environments are not available for many GNSS denial environments.

This document describes methods and systems for vehicle localization based on radar detections in garages and other GNSS denial environments. Radar localization starts with building a radar reference map (e.g., a radar occupancy grid) for GNSS denial environments. The radar reference map may be generated and updated using different techniques as described herein. Once a radar reference map is available, real-time localization may be achieved with inexpensive radar sensors. Using the techniques described in this document, the data from the radar sensors may be processed to identify stationary localization objects, or landmarks, in the vicinity of the vehicle. Comparing the landmark data originating from the onboard sensors and systems of the vehicle with landmark data detailed in the radar reference map may generate an accurate pose of the vehicle in its environment. By using inexpensive radar systems, a highly accurate vehicle pose may be obtained in a cost-effective manner.

Example Environment

Figure 1:
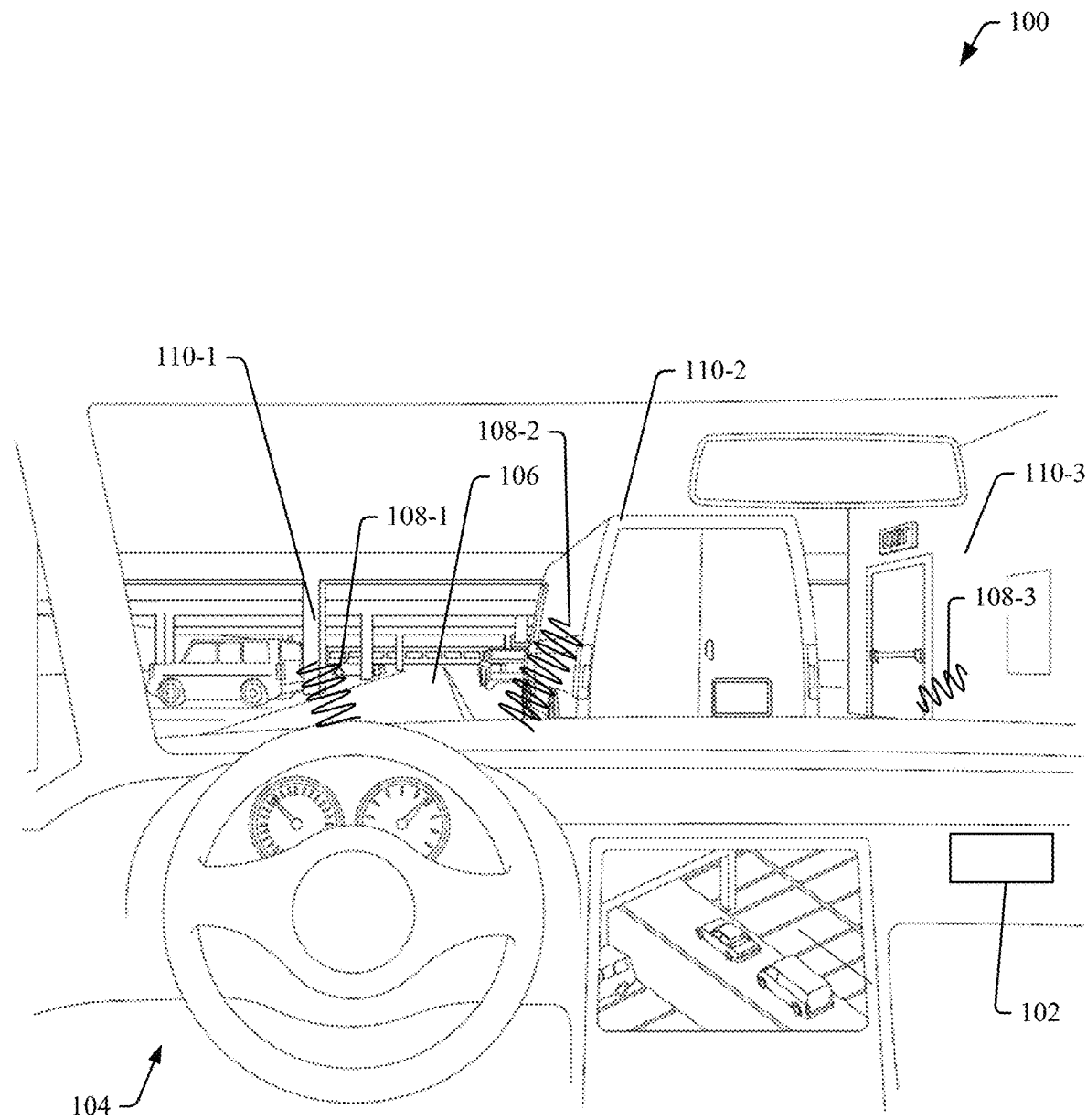
FIG. 1 is an example illustration of an environment in which vehicle localization based on radar detections in garages may be implemented, in accordance with techniques of this disclosure.

FIG. 1 is an example illustration of an environment 100 in which vehicle localization based on radar detections in garages may be implemented, in accordance with the techniques of this disclosure. In particular, a radar reference map may be generated, updated, or used in the environment 100 to navigate a vehicle 104 in the garage. In the example environment 100, a system 102 is in the vehicle 104 (e.g., a host vehicle) that is traveling along a roadway 106 in a parking garage or other GNSS denial environment.

The system 102 utilizes a radar system (not shown) to transmit radar signals (not shown). The radar system receives radar reflections 108 (radar detections) of the radar signals from objects 110. In the environment 100, the radar reflection 108-1 corresponds to object 110-1 (e.g., a pillar), the radar reflection 108-2 corresponds to object 110-2 (e.g., a vehicle), and the radar reflection 108-3 corresponds to object 110-3 (e.g., a wall of the garage).

Figure 2:
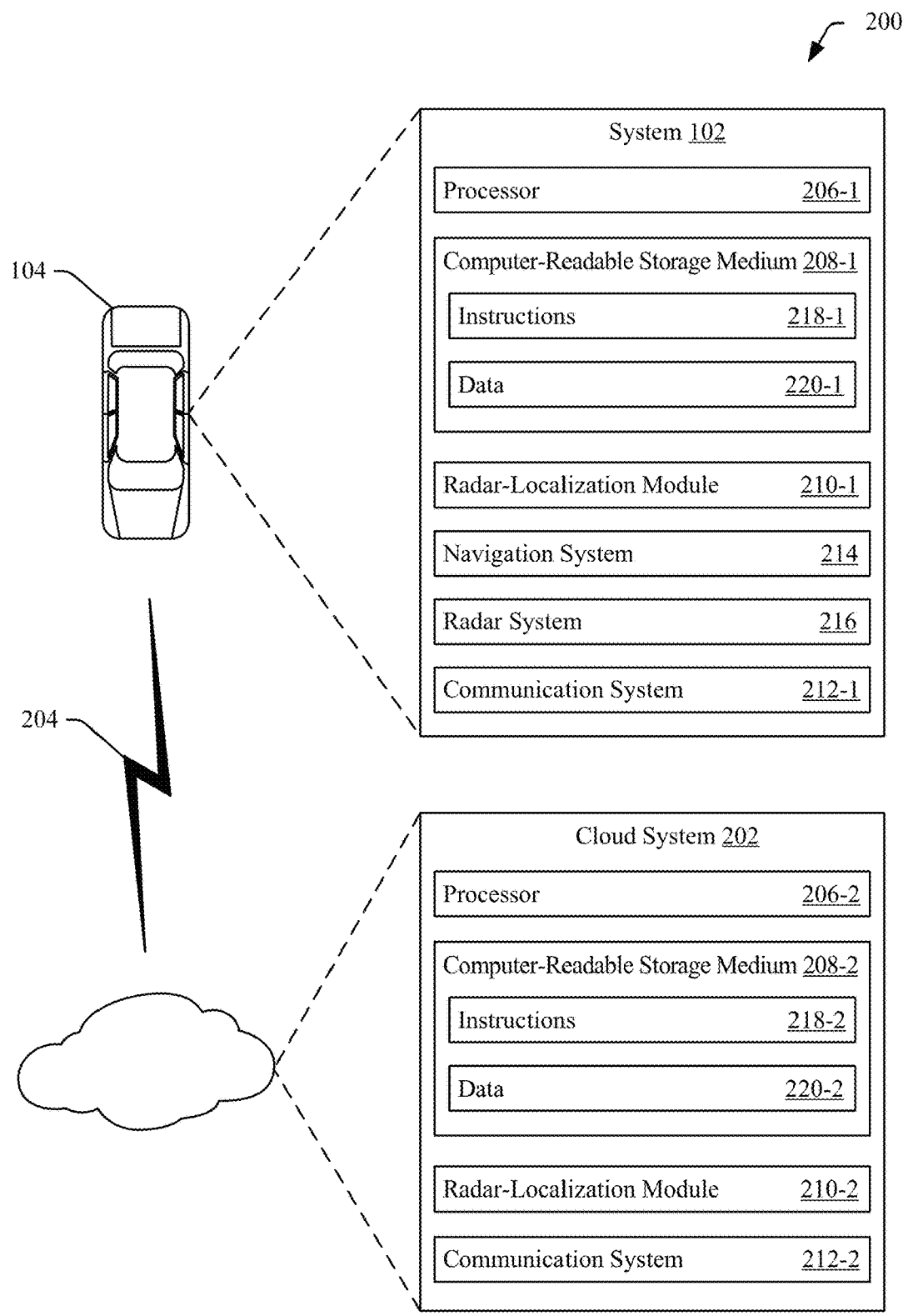
FIG. 2 is an example illustration of systems that may be used to implement vehicle localization based on radar detections in garages, in accordance with techniques of this disclosure.
Figure 4:
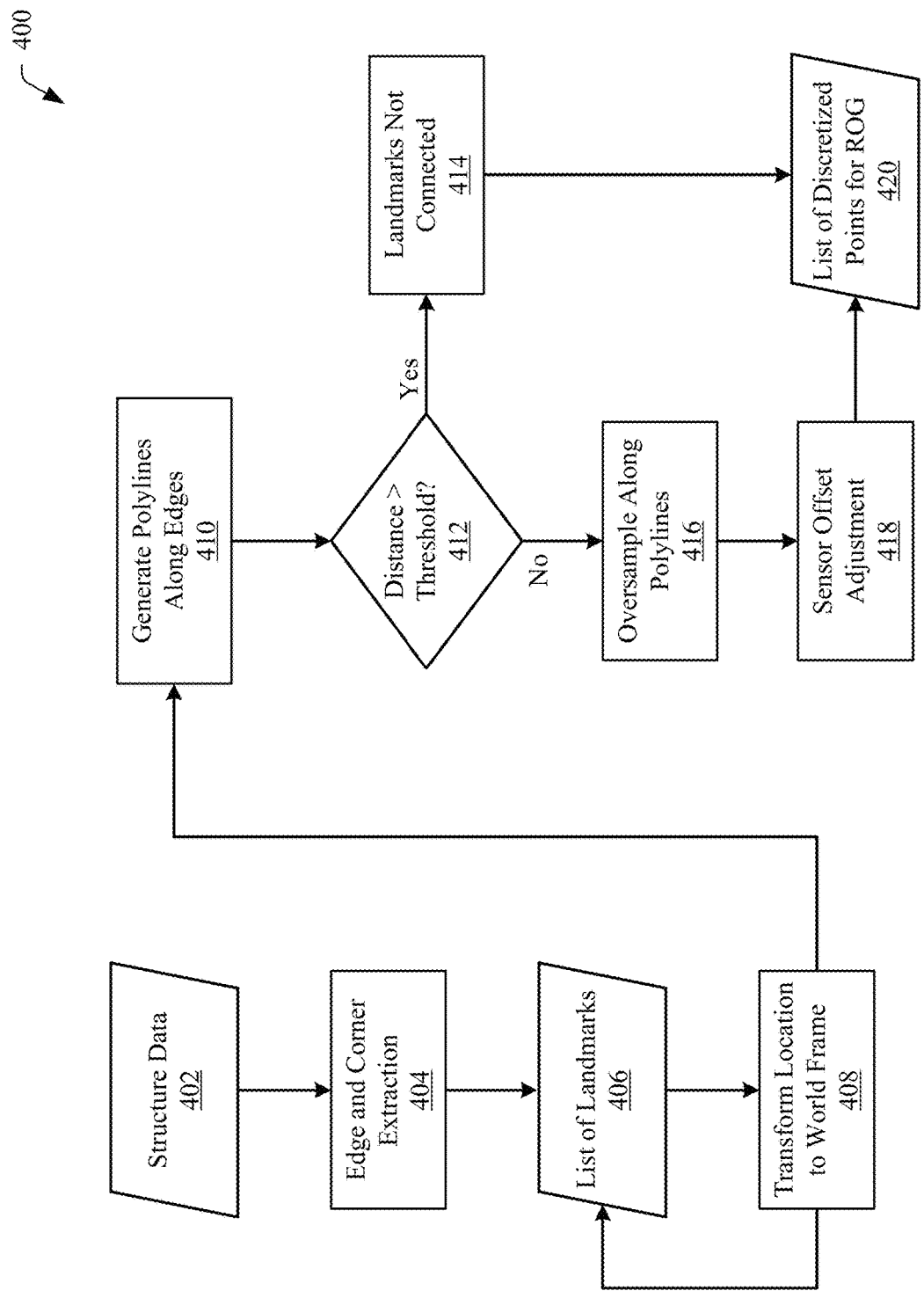
FIG. 4 is an example conceptual diagram of a process to generate a radar occupancy grid for vehicle localization in garages.
Figures 1, 5:
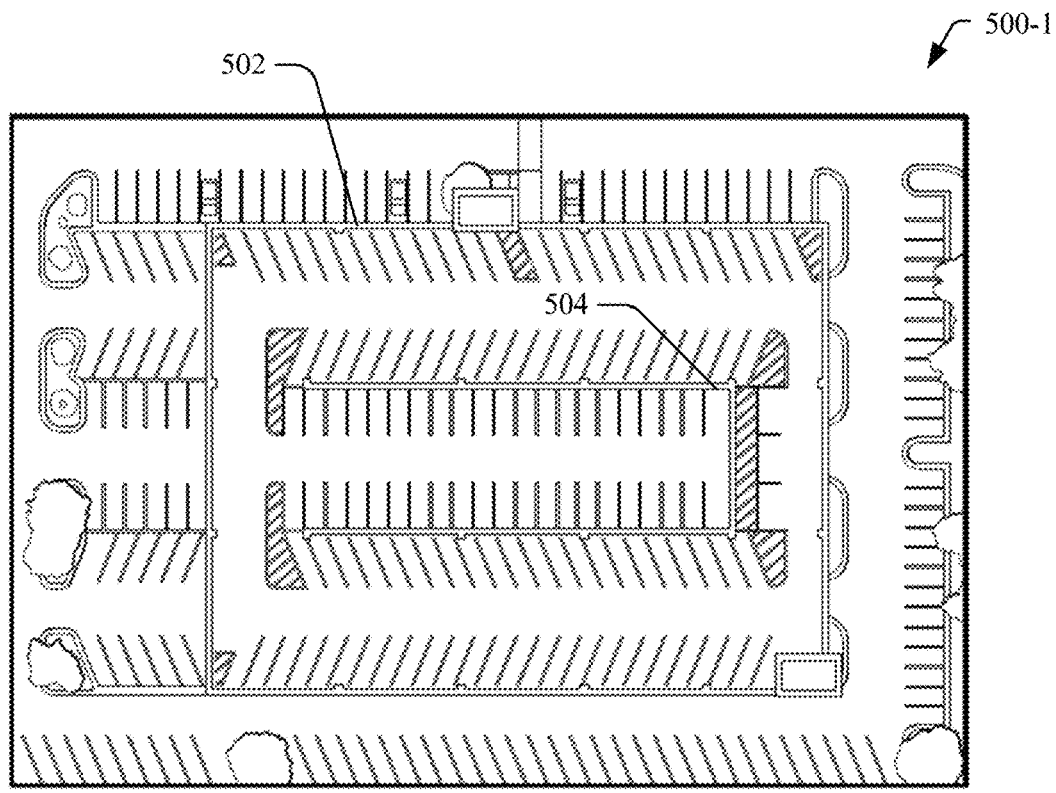
Figures 2, 5:
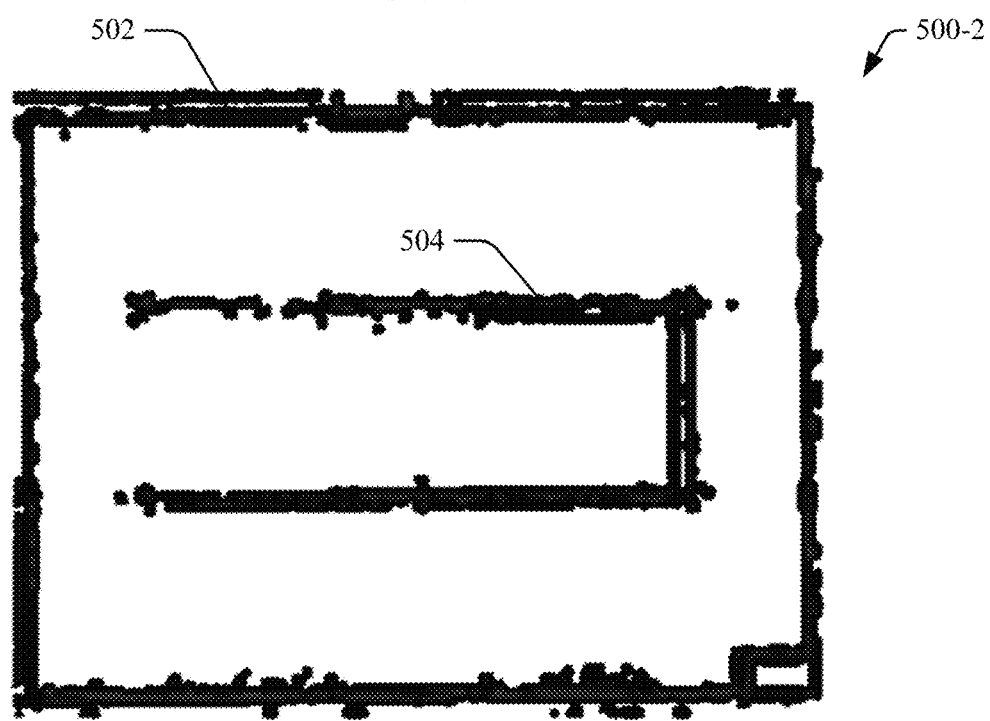

The radar reflections 108 may be used to navigate the environment 100 based on a radar reference map generated by the system 102 or a remote system (not shown) for the environment, as discussed in reference to FIGS. 4 through 5-2. The radar reflections 108 may further be used in conjunction with an existing radar reference map to localize the vehicle 104.

Example Systems

FIG. 2 is an example illustration 200 of systems that may be used to implement vehicle localization based on radar detections in garages, in accordance with techniques of this disclosure. The example illustration 200 comprises the system 102 of the vehicle 104 and a cloud system 202. Although the vehicle 104 is illustrated as a car, the vehicle 104 may comprise any vehicle (e.g., a truck, a bus, a boat, a plane) without departing from the scope of this disclosure. The system 102 and the cloud system 202 may be connected via communication link 204. One or both of the system 102 and the cloud system 202 may be used to perform the techniques described herein.

As illustrated in FIG. 2, the system 102 and the cloud system 202 each include at least one processor 206 (e.g., processor 206-1 and processor 206-2, respectively), at least one computer-readable storage medium 208 (e.g., computer-readable storage medium 208-1 and 208-2, respectively), radar-localization modules 210 (e.g., radar-localization module 210-1 and 210-2, respectively), and communication systems 212 (e.g., communication system 212-1 and 212-2, respectively). The communication systems 212 facilitate the exchange of data, including a radar reference map for a parking garage (e.g., the environment 100 of FIG. 1) or other GNSS denial environments over the communication link 204.

The system 102 additionally includes a navigation system 214 and a radar system 216. The navigation system 214 may include a geospatial positioning system (e.g., a global positioning system (GPS), global navigation satellite system (GNSS or GLONASS) sensor), an inertial measurement system (e.g., a gyroscope or accelerometer), or other sensors (e.g., a magnetometer, software positioning engine, wheel tick sensor, lidar odometer, vision odometer, radar odometer, or other sensor odometers). The navigation system 214 may provide high-accuracy location data (e.g., to within a meter) under ideal conditions or low-accuracy location data (e.g., to within a couple of meters) under non-ideal conditions (e.g., within a parking garage).

The radar system 216 includes radar hardware to transmit and receive radar signals (e.g., radar reflections 108). In some implementations, the radar system 216 provides static detections to the radar-localization modules 210 (e.g., filtering may be performed within the radar system 216).

The processors 206 (e.g., application processors, microprocessors, digital signal processors (DSP), or controllers) are configured to execute computer-executable instructions 218 (e.g., instructions 218-1 and 218-2) stored within the computer-readable storage media 208 (e.g., non-transitory storage devices such as hard drives, solid state drives (SSD), flash memories, read-only memories (ROM), erasable programmable ROM (EPROM), or electrically erasable programmable ROM (EEPROM)) to cause the system 102 and cloud system 202 to perform the techniques described herein. The instructions 218 may be part of operating systems and/or one or more applications of the system 102 and cloud system 202.

The instructions 218 cause the system 102 and the cloud system 202 to act upon (e.g., create, receive, modify, delete, transmit, or display) data 220 (e.g., 220-1 and 220-2). The data 220 may comprise application data, module data, sensor data, or input/output (I/O) data. The data 220 also includes a radar reference map for GNSS denial environments (e.g., parking garages). Although shown within the computer-readable storage media 208, portions of the data 220 may be within random-access memories (RAM) or caches of the system 102 and the cloud system 202 (not shown). Furthermore, the instructions 218 and/or the data 220 may be remote to the system 102 and the cloud system 202.

The radar-localization modules 210 (or portions thereof) may be located within the computer-readable storage media 208 or be stand-alone components (e.g., executed in dedicated hardware in communication with the processors 206 and computer-readable storage media 208). For example, the instructions 218 may cause the processors 206 to implement or otherwise cause the system 102 or the cloud system 202 to implement the techniques described herein.

Building a Radar Reference Map

Figure 3:
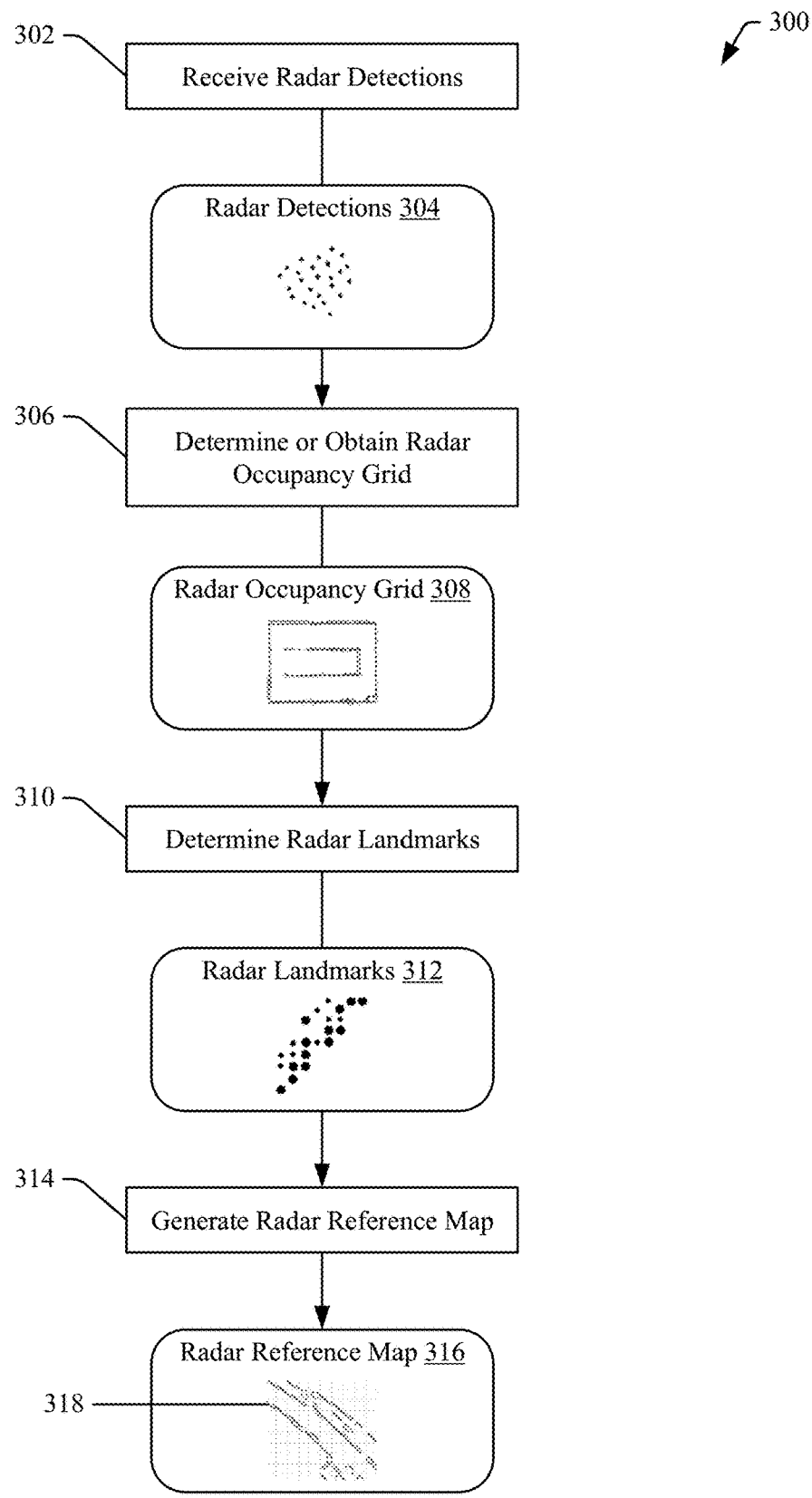
FIG. 3 is an example conceptual diagram of a process to generate a radar reference map for vehicle localization in garages, in accordance with techniques of this disclosure.

FIG. 3 is an example conceptual diagram 300 of a process to generate a radar reference map for vehicle localization in garages. Conceptual diagram 300 may be performed by the system 102 and/or the cloud system 202. The conceptual diagram 300 may include additional or fewer operations or be performed in a different order.

At 302, radar detections 304 are received. The radar detections 304 comprise stationary radar detections (e.g., detections of stationary objects from radar system 216 including signs, poles, barriers, landmarks, buildings, overpasses, curbs, road-adjacent objects such as fences, trees, flora, foliage, or spatial statistical patterns) with corresponding coordinates for respective times and/or locations (e.g., from navigation system 214). The radar detections 304 may comprise point clouds, have corresponding uncertainties, and/or include various radar data or sensor measurements.

At 306, a radar occupancy grid 308 is obtained from the system 102 or the cloud system 202. Techniques of determining the radar occupancy grid 308 are discussed further in regard to FIGS. 4, 5-1, and 5-2. The radar occupancy grid 308 is a grid-based representation of a GNSS denial environment (e.g., a parking garage). For example, the radar occupancy grid 308 may be a Bayesian, Dempster Shafer, or other type of occupancy grid. Each cell of the radar occupancy grid 308 represents an independent portion of space, and each cell value of the radar occupancy grid 308 represents a probability (e.g., 0-100%) that the corresponding portion of space is occupied. A probability of around 0% for a cell may indicate that the corresponding portion of space is free or not permanently occupied, while a probability closer to 100% may indicate that the corresponding portion of space is occupied (e.g., by a wall or column), and therefore, not free space. The radar occupancy grid 308 may also be supplemented with information determined from the radar detections 302.

At 310, radar landmarks 312 are determined from the radar occupancy grid 308. The radar landmarks 312 are center coordinates of respective groups of cells of the radar occupancy grid 308 with probabilities greater than a threshold. The radar landmarks 312 comprise clusters, contours, or bounding boxes of the cells of the radar occupancy grid 308. The radar landmarks 312 have weights based on one or more of probabilities, classifications, or cross-section values of the respective radar landmarks 312. The radar landmarks 312 may be determined using binarization, a clustering algorithm, or machine learning on the radar occupancy grid 308. The determination of the radar landmarks 312 generally applies a threshold value to the radar occupancy grid 308 and removes any noise from the radar occupancy grid 308. In other implementations, the radar landmarks 312 may already be determined or identified in the radar occupancy grid 308.

At 314, a radar reference map 316 is generated from the radar landmarks 312 and/or the radar occupancy grid 308. The radar reference map 316 may be a statistical reference map (e.g., a Gaussian representation). The radar reference map 316 can include a collection of Gaussians 318 corresponding to occupied areas. The Gaussians 318 (or the cells of the radar reference map 316) have associated location information (e.g., low or high-quality location information depending on how the radar reference map 316 is generated). Each cell of the radar reference map 316 can have a single Gaussian 318 or be blank. Although not required, the radar reference map 316 has cells that are larger than the cells of the radar occupancy grid 308. The radar reference map 316 can be a stand-alone map or a layer in another map (e.g., a layer in a high-definition (HD) map).

The system 102 can use the radar occupancy grid 308 and the radar detections 304 to remove static objects (e.g., parked vehicles) from the radar reference map 316. For example, the system 102 can receive the radar detections 304 from one or more radar sensors positions around the vehicle 104. The system 102 determines whether a radar detection 304 is a static detection based on ego-trajectory information and outputs any identified static detections.

The radar reference map 316 may contain metadata associated with the respective Gaussians 318. For example, the metadata may contain information about shapes or dimensions of clusters of Gaussians 318. The metadata may also include object associations, e.g., certain Gaussians 318 belong to a sign or guardrail. The location data may also be contained within the metadata.

FIG. 4 is an example conceptual diagram 400 of a process to generate a radar occupancy grid for vehicle localization in garages and other GNSS denial environments. The conceptual diagram 400 can represent operation 306 (determine radar occupancy grid) of FIG. 3 performed by the system 102 of the vehicle 104 or the cloud system 202. In other implementations, the output of the conceptual diagram 400 can be the radar occupancy grid 308 of FIG. 3 that is obtained by the system 102 from memory or from cloud system 202. The radar occupancy grid 308 provides a reference map in a world or map coordinate system that the system 102 can use to localize the vehicle 104. The conceptual diagram 400 can be performed by the system 102 alone or in combination with the cloud system 202. For purposes of this discussion, this document will describe the system 102 as performing the operations of the conceptual diagram 400.

The system 102 begins with a series of processing operations to generate a series of edges and corners as radar localization landmarks. At 404, the system 102 performs edge and corner extraction on structure data 402 to generate a list of landmarks 406. The structure data 402 provides a two-dimensional footprint of the edges and corners for GNSS denial environments. Because high-definition maps are generally not available for parking garages and other GNSS denial environments, system 102 uses existing two-dimensional building structural representations to obtain the structure data 402 and generate the list of landmarks 406. For example, the system 102 can use blueprints, design drawings, or satellite imagery to extract the walls, columns, edges, and corners of GNSS denial environments. The features included in the structure data 402 can be processed using image processing algorithms to identify lines and corners.

If the structure data 402 is a satellite image, the system 102 can perform operation 404 by binarizing the satellite image to a grayscale image and enhancing the contrast. The system 102 can then apply a Prewitt approximation algorithm or another edge and corner extraction algorithm to extract edges and corners from the structure data 402 and generate the list of landmarks 406. As another example, the system 102 can use a machine-learned model to process color or grayscale images containing the structure data 402.

At 408, the system 102 transforms the location of each object in the list of landmarks 406 to a world frame. For example, the system 102 can then define the area in which the parking garage is located in a global frame or map coordinate system. The system 102 can then determine the coordinates of each landmark in the map coordinate system.

At 410, the system 102 performs a series of additional processing operations to generate polylines along each edge of the landmarks. The polylines are geometric representations of the landmarks relative to the radar occupancy grid 308. For example, a location, orientation, and specifics (e.g., offset) of a wall or column may be used to generate a polyline of occupied spaces in the radar occupancy grid 308 that correspond to the wall or column.

At 412, the system 102 determines whether the distance between two landmarks is greater than a threshold. At 414, if the distance between the landmarks is greater than the threshold, the system 102 determines that the landmarks are not connected. At 416, if the distance between the landmarks is not greater than the threshold, the system 102 oversamples along the polylines to simulate the output of a radar occupancy grid. The system 102 can also compare the length of a respective polyline to a grid size of the radar occupancy grid 308. If a polyline is not longer than a grid cell of the radar occupancy grid 308, the corresponding grid cell is marked as not being occupied. If a polyline is longer than the grid cell, the system 102 can oversample to create an oversampled polyline. The oversampling comprises adding more points along the respective polyline to simulate a radar occupancy grid output from radar detections.

At 418, the system 102 can perform a sensor offset adjustment to adjust the polylines or oversampled polylines.

For example, if there is a known sensor perception offset for a particular type of sensor, the system 102 can apply this to the sampling along the polylines or oversampled polylines and generate a list of discretized points for the radar occupancy grid. Each cell of the radar occupancy grid represents a probability that the cell is occupied or not occupied by a landmark. The radar occupancy grid can then be used for real-time localization within the garage or other GNSS denial environment as described with respect to FIG. 3.

FIGS. 5-1 and 5-2 are illustrations of example edges and lines extracted from a satellite image for vehicle localization in a parking garage. In particular, FIG. 5-1 illustrates an example satellite image 500-1 of a parking garage structure. The satellite image 500-1 provides a top view of the parking garage structure. The parking garage structure includes an outer wall 502 that has an approximately rectangular shape. The parking garage structure also includes an inner wall 504 that provides a ramp between parking levels of the parking garage structure and has an approximately U shape.

FIG. 5-2 illustrates example landmarks 500-2 for the parking garage structure. The system 102 or the cloud system 202 can extract the lines, edges, and corners as the landmarks 500-2 from the satellite image 500-1 using the conceptual diagram 400 of FIG. 4. A radar occupancy grid can then be generated with an assumption that the top floor layout of the parking garage structure as depicted in the satellite image 500-1 is representative of each floor of the parking garage structure. If the parking garage structure has varying floorplans for each level, then structural maps or blueprints are used to build the radar occupancy grid for each level.

Example Method

Figure 6:
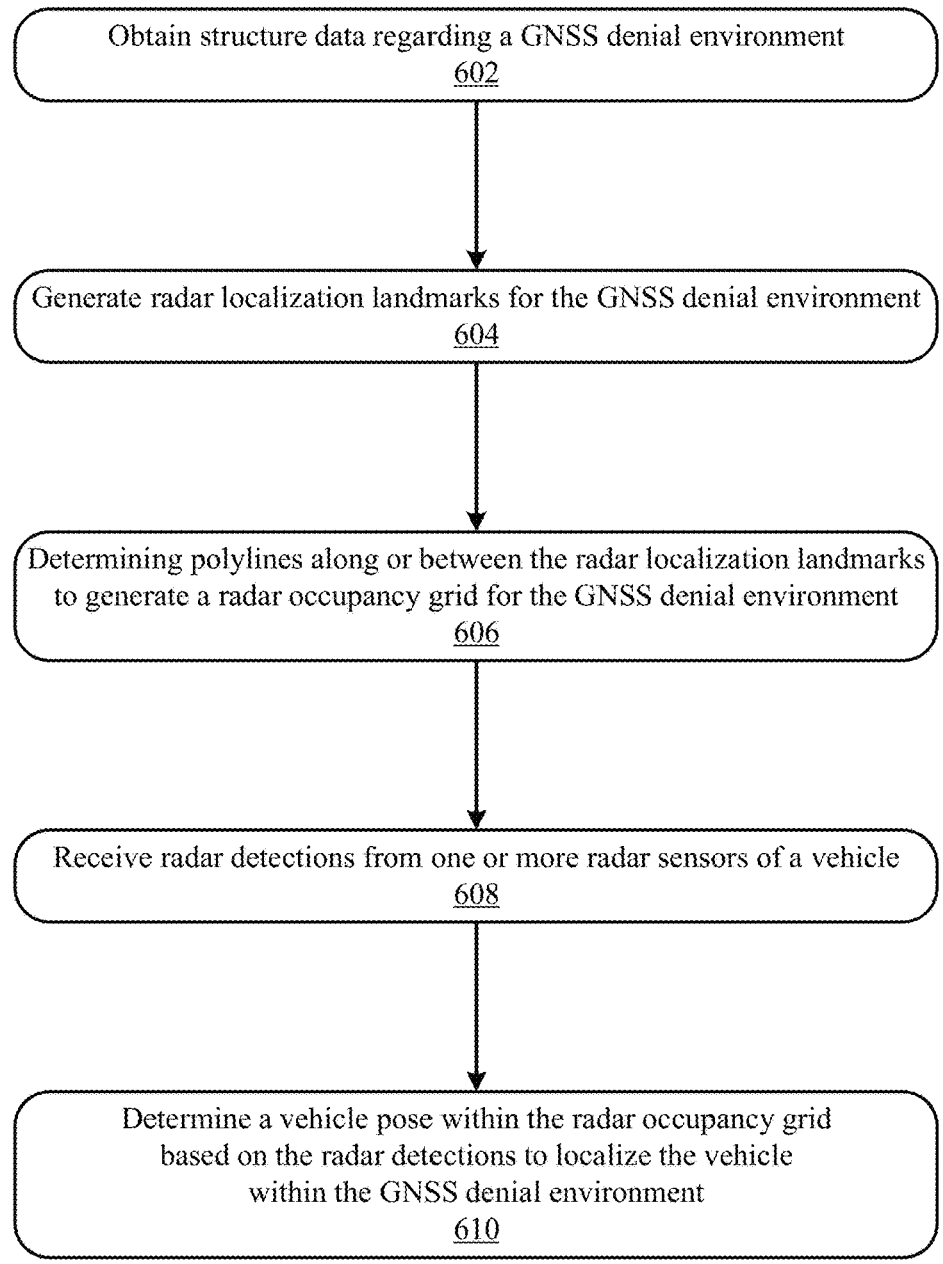
FIG. 6 illustrates an example method for vehicle localization based on radar detections in a parking garage.

FIG. 6 illustrates an example method 600 for vehicle localization based on radar detections in a parking garage. Method 600 is shown as sets of operations (or acts) performed, but not necessarily limited to the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 5, reference to which is made for example only. The techniques are not limited to performance by one entity or multiple entities. For example, the system can be the system 102 of FIGS. 1 and 2 or the cloud system 202 of FIG. 2.

At 602, structure data regarding a GNSS denial environment is obtained. For example, the cloud system 202 can obtain structure data 402 regarding the environment 100, which can include a parking garage. The structure data can include a satellite image of the GNSS denial environment. The structure data can also include blueprints or other design drawings of the GNSS denial environment.

At 604, radar localization landmarks for the GNSS denial environment are generated from the structure data. The radar localization landmarks include at least one of edges or corners of the GNSS denial environment. For example, the cloud system 202 can generate radar localization landmarks for the environment 100, including edges, corners, and columns of the parking garage from the structure data 402.

The cloud system 202 can binarize a satellite image of the GNSS denial environment to a grayscale image. The cloud system 202 can then apply an extraction algorithm to the grayscale image to identify the radar localization landmarks. Before performing the extraction process, the cloud system 202 can also enhance the contrast of the grayscale image or perform pixel enhancement on at least some pixels of the grayscale image to improve the extraction of the radar localization landmarks. The cloud system 202 can also apply geofencing techniques to the grayscale image to focus its processing on a certain region of the grayscale image.

At 606, polylines along or between the radar localization landmarks are determined to generate a radar occupancy grid for the GNSS denial environment. For example, the cloud system 202 can generate polylines along or between the radar localization landmarks. The polylines can be used to generate the radar occupancy grid 308 for the environment 100. The cloud system 202 can also transform each radar localization landmark and the radar occupancy grid 308 to a map coordinate system.

At 608, radar detections from one or more radar sensors of a vehicle can be received. For example, the system 102 can receive radar detections 304 from one or more radar sensors of the vehicle 104. The system 102 can also generate a probability of occupancy for any location in the GNSS denial environment. The probability can be based on the radar occupancy grid 308 and the radar detections 304.

At 610, a vehicle pose within the radar occupancy grid can be determined based on the radar detections to localize the vehicle within the GNSS denial environment. For example, the system 102 can determine a vehicle pose within the radar occupancy grid 308 based on the radar detections 304. In some implementations, the system 102 can use the radar detections 304 to remove temporary static objects (e.g., parked vehicles) from the radar reference map 316. The vehicle pose can be used to localize the vehicle 104 within the environment 100. The system 102 can use the map coordinate system and the radar occupancy grid 308 to operate the vehicle 104 to enter the GNSS denial environment. The system 102 can also the vehicle pose and the radar occupancy grid 308 to operate the vehicle (e.g., park the vehicle) in the GNSS denial environment.

EXAMPLES

Example 1. A method comprising: obtaining structure data regarding a GNSS denial environment; generating, from the structure data, radar localization landmarks for the GNSS denial environment, the radar localization landmarks including at least one of edges or corners of the GNSS denial environment; determining polylines along or between the radar localization landmarks to generate a radar occupancy grid for the GNSS denial environment; receiving radar detections from one or more radar sensors of a vehicle; and determining, based on the radar detections, a pose of the vehicle within the radar occupancy grid to localize the vehicle within the GNSS denial environment.

Example 2. The method of Example 1, wherein the GNSS denial environment is a parking structure.

Example 3. The method of Example 2, wherein the structure data comprises a satellite image of the parking structure.

Example 4. The method of Example 3, wherein generating the radar localization landmarks for the GNSS denial environment comprises: binarizing the satellite image of the GNSS denial environment to a grayscale image; and applying an extraction algorithm to the grayscale image to identify the radar localization landmarks.

Example 5. The method of Example 4, wherein generating the radar localization landmarks for the GNSS denial environment further comprises prior to applying the extraction algorithm to the grayscale image, at least one of enhancing a contrast of the grayscale image, performing pixel enhancement on at least some pixels of the grayscale image, or applying geofencing to the grayscale image.

Example 6. The method of any preceding example, the method further comprising: transforming each radar localization landmark and the radar occupancy grid to a map coordinate system; and operating, using the map coordinate system and the radar occupancy grid, the vehicle to enter the GNSS denial environment.

Example 7. The method of any preceding example, wherein the structure data comprises blueprints or design drawings of the GNSS denial environment.

Example 8. The method of any preceding example, the method further comprising: operating, using the radar occupancy grid and the pose of the vehicle, the vehicle in the GNSS denial environment.

Example 9. The method of any preceding example, the method further comprising: generating a probability of an occupancy for any location in the GNSS denial environment, the probability being based on the radar occupancy grid and the radar detections.

Example 10. A system comprising: one or more processors configured to perform the method of any preceding example.

Example 11. A non-transitory computer-readable medium that stores computer-executable instructions that, when executed by a processor, cause the processor to perform the method of any one of Examples 1 through 9.

CONCLUSION

Although implementations of vehicle localization based on radar detections in garages and other GNSS denial environments have been described in language specific to certain features and/or methods, the subject of the appended claims is not necessarily limited to the specific features or methods described. Rather, the specific features and methods are disclosed as example implementations for vehicle localization based on radar detections in garages. Further, although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples.

What is claimed is:

1. A method comprising:
    obtaining structure data regarding a GNSS denial environment;
    generating, from the structure data, radar localization landmarks for the GNSS denial environment, the radar localization landmarks including at least one of edges or corners of the GNSS denial environment;
    determining polylines along or between the radar localization landmarks to generate a radar occupancy grid for the GNSS denial environment;
    receiving radar detections from one or more radar sensors of a vehicle; and
    determining, based on the radar detections, a pose of the vehicle within the radar occupancy grid to localize the vehicle within the GNSS denial environment.

2. The method of claim 1, wherein the GNSS denial environment is a parking structure.

3. The method of claim 2, wherein the structure data comprises a satellite image of the parking structure.

4. The method of claim 3, wherein generating the radar localization landmarks for the GNSS denial environment comprises:
    binarizing the satellite image of the GNSS denial environment to a grayscale image; and
    applying an extraction algorithm to the grayscale image to identify the radar localization landmarks.

5. The method of claim 4, wherein generating the radar localization landmarks for the GNSS denial environment further comprises, prior to applying the extraction algorithm to the grayscale image, at least one of enhancing a contrast of the grayscale image, performing pixel enhancement on at least some pixels of the grayscale image, or applying geofencing to the grayscale image.

6. The method of claim 1, the method further comprising:
    transforming each radar localization landmark and the radar occupancy grid to a map coordinate system; and
    operating, using the map coordinate system and the radar occupancy grid, the vehicle to enter the GNSS denial environment.

7. The method of claim 1, wherein the structure data comprises blueprints or design drawings of the GNSS denial environment.

8. The method of claim 1, the method further comprising:
    operating, using the radar occupancy grid and the pose of the vehicle, the vehicle in the GNSS denial environment.

9. The method of claim 1, the method further comprising:
    generating a probability of an occupancy for any location in the GNSS denial environment, the probability being based on the radar occupancy grid and the radar detections.

10. A system comprising:
    one or more processors configured to:
        obtain structure data regarding a GNSS denial environment;
        generate, from the structure data, radar localization landmarks for the GNSS denial environment, the radar localization landmarks including at least one of edges or corners of the GNSS denial environment;
        determine polylines along or between the radar localization landmarks to generate a radar occupancy grid for the GNSS denial environment;
        receive radar detections from one or more radar sensors of a vehicle; and
        determine, based on the radar detections, a pose of the vehicle within the radar occupancy grid to localize the vehicle within the GNSS denial environment.

11. The system of claim 10, wherein the GNSS denial environment is a parking structure.

12. The system of claim 11, wherein the structure data comprises a satellite image of the parking structure.

13. The system of claim 12, wherein the one or more processors are configured to generate the radar localization landmarks for the GNSS denial environment by:
    binarizing the satellite image of the GNSS denial environment to a grayscale image; and
    applying an extraction algorithm to the grayscale image to identify the radar localization landmarks.

14. The system of claim 13, wherein the one or more processors are configured to generate the radar localization landmarks for the GNSS denial environment by, prior to application of the extraction algorithm to the grayscale image, at least one of enhancing a contrast of the grayscale image, performing pixel enhancement on at least some pixels of the grayscale image, or applying geofencing to the grayscale image.

15. The system of claim 10, wherein the one or more processors are further configured to:
  transform each radar localization landmark and the radar occupancy grid to a map coordinate system; and
  operate, using the map coordinate system and the radar occupancy grid, the vehicle to enter the GNSS denial environment.

16. The system of claim 10, wherein the structure data comprises blueprints or design drawings of the GNSS denial environment.

17. The system of claim 10, wherein the one or more processors are further configured to operate, using the radar occupancy grid and the pose of the vehicle, the vehicle in the GNSS denial environment.

18. The system of claim 10, wherein the one or more processors are further configured to generate a probability of an occupancy for any location in the GNSS denial environment, the probability being based on the radar occupancy grid and the radar detections.

19. A non-transitory computer-readable medium that stores computer-executable instructions that, when executed by a processor, cause the processor to:
  obtain structure data regarding a GNSS denial environment;
  generate, from the structure data, radar localization landmarks for the GNSS denial environment, the radar localization landmarks including at least one of edges or corners of the GNSS denial environment;
  determine polylines along or between the radar localization landmarks to generate a radar occupancy grid for the GNSS denial environment;
  receive radar detections from one or more radar sensors of a vehicle; and
  determine, based on the radar detections, a pose of the vehicle within the radar occupancy grid to localize the vehicle within the GNSS denial environment.

20. The non-transitory computer-readable medium of claim 19, wherein:
  the GNSS denial environment is a parking structure;
  the structure data comprises a satellite image of the parking structure; and
  generation of the radar localization landmarks for the GNSS denial environment comprises:
    binarizing the satellite image of the GNSS denial environment to a grayscale image; and
    applying an extraction algorithm to the grayscale image to identify the radar localization landmarks.

\* \* \* \* \*